3,472,081
HAND MOTOR TO DRIVE TOOLS FOR SURGICAL PURPOSES AT DIFFERENT SPEEDS OR OSCILLATION FREQUENCIES
Arnold Keller and Fritz Georg Pohl, Kiel-Dietrichsdorf, Germany, assignors to Austenal Europa, Inc., Zweigniederlassung Kiel, vormals Ernst Pohl, Kiel-Dietrichsdorf, Germany
Filed Apr. 28, 1967, Ser. No. 634,647
Int. Cl. F16h *21/18, 3/64*
U.S. Cl. 74—48                                                5 Claims

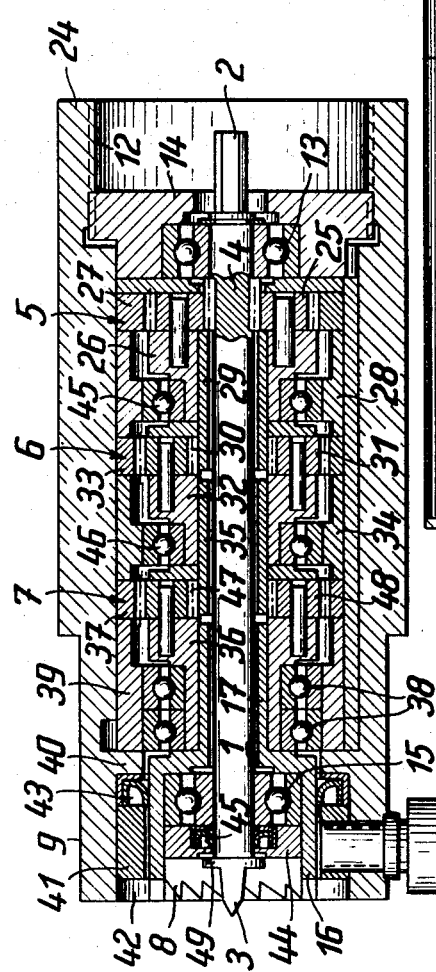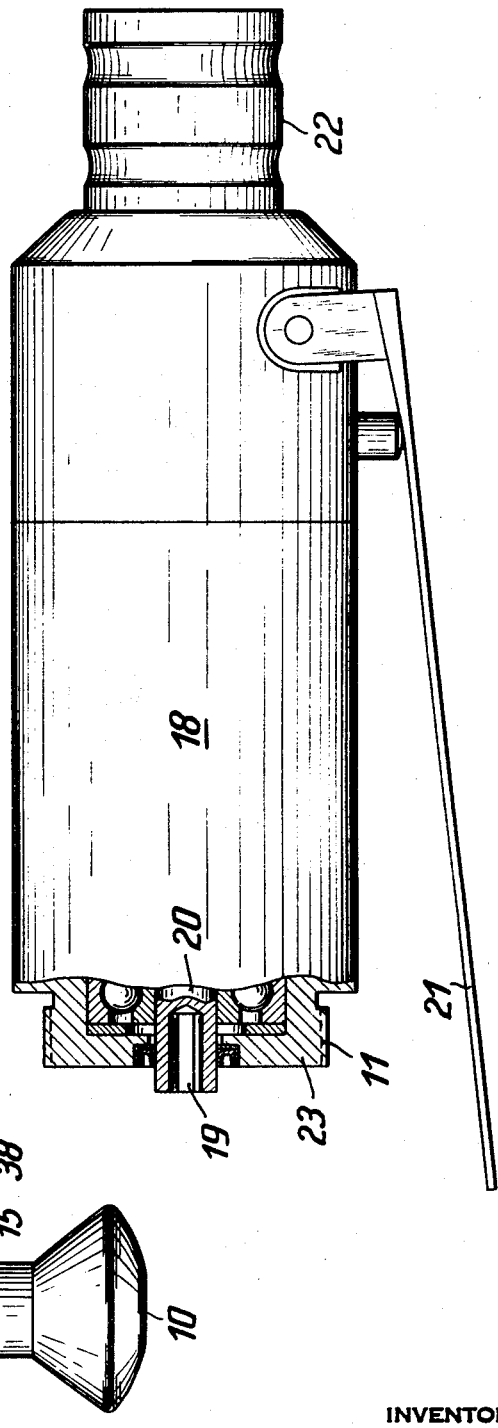

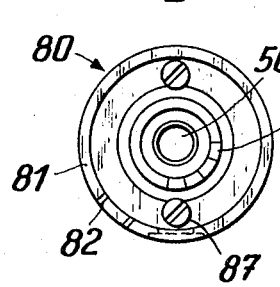
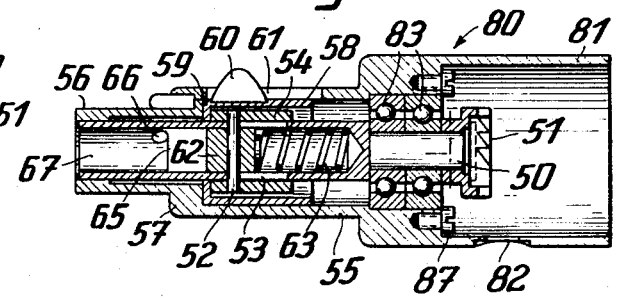
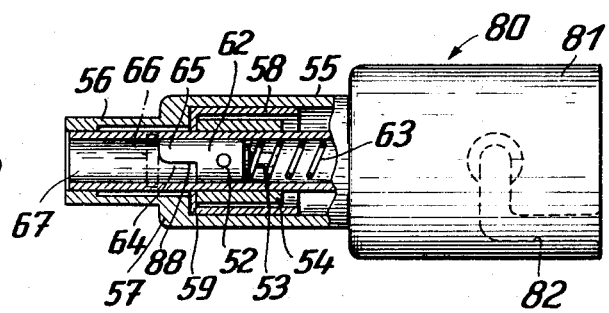
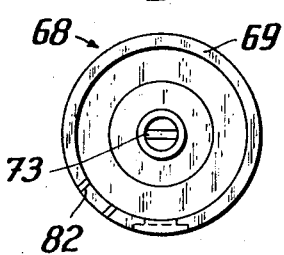
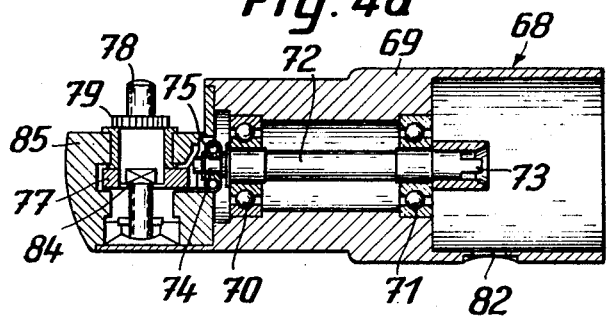
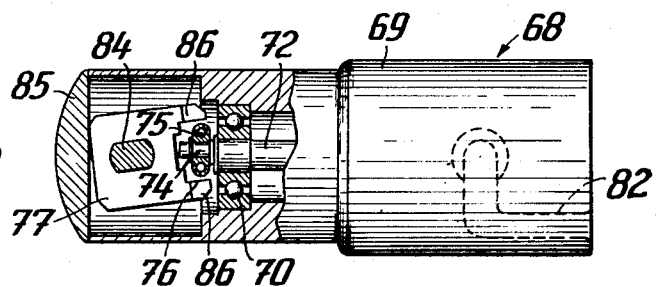
INVENTORS
ARNOLD KELLER
BY FRITZ GEORG POHL
ATTYS United States Patent Office 3,472,081
Patented Oct. 14, 1969

ABSTRACT OF THE DISCLOSURE

A portable, multi-speed driving device particularly adaptable for use with surgical tools, including a motor driven transmission having a direct drive shaft and a planetary geared speed reduction system concentrically disposed about the shaft wherein both the shaft and the gearing includes output portions concentrically related to each other and having clutch means. The driving unit including means for attaching tools thereto, the tools having a clutch input device radially spaced from its axis of rotation a distance for engagement with the desired driving device output whereby attachment of tools to the driving device automatically provides the desired speed of rotation therefor.

DESCRIPTION OF THE PRIOR ART

Hand motors of this type are known which comprise a housing having on the one hand entering therein the shaft of a motor replaceably fastened thereat and, on the other hand, an output shaft device exiting therefrom adapted to be coupled with tools of different speed and torque requirements and to be driven by the driving motor either directly or through a change-speed transmission arranged in the housing and equipped with at least one speed stage. In this arrangement the individual tools are supported in tool holder heads adapted to be replaceably fastened at the housing.

These known hand motors, however, comprise only one output shaft which may be operated at different speeds and which may now be coupled with the individual tools supported each in a respective tool holder head. The respectively desired driving speed, in this arrangement, is adjusted by means of a switching handle which changes the change-speed ratio in any suitable way.

This results in the shortcoming that the respectively used tool is not positively associated with the speed that suits it, so that it is possible for the tool just inserted to be driven at a wrong speed. This shortcoming is the greater for the fact that such hand motors are mostly, if not exclusively, used in surgical operations, during which time all the people concerned should be exempted as much as possible from duties which call for special attention. The necessity of having to adjust the respectively desired speed by means of a special grip constitutes an additional shortcoming.

Now, the invention is concerned with the problem of providing a hand motor of the type described in which the respectively used tool is positively driven at the suitable speed without any special switching operation having to be performed at the hand motor.

SUMMARY OF THE INVENTION

In accordance with the invention, the problem is solved in that a special output shaft is provided for each speed, said output shaft being supported in the housing, and in that these output shafts are provided with special coupling devices deviating from each other, for coupling with the individual tools.

In principle, this idea of the invention could also be performed by arranging several shafts side by side in parallel in the housing which are driven at different speeds. An especially suitable embodiment of the invention, however, is obtained when the output shafts are supported concentric with respect to each other in the housing and the shaft of lower speed encloses the one of higher speed. As a rule, it will suffice if two shafts of different speed are provided. But the invention may also be performed with more than two shafts, this plurality of shafts being suitably arranged also concentrically one within the other.

Suitably, the tool holder heads are provided with like devices to be replaceably fastened with the housing.

Such hand motors must, on the one hand, be extremely reliable and, on the other hand, the dimensions thereof must be kept possibly small, in order to facilitate the handling of the apparatus by the doctor, and to improve the accessibility from unfavourably positioned working location. For this purpose, it will be recommendable, in accordance with the invention, to provide a plurality of series-connected planetary gearings as a change-speed transmission, concentrically surrounding the output shaft driven directly by the drive motor.

By the invention, the operator, for example, the surgeon or orthopaedist, is afforded a light, handy apparatus which may be sterilized in any suitable way and allows for the following operations:

to bore open marrow enclosure above a lying spear,
to bore with normal spiral drills,
to mill with the usual bone cutters,
to perform oscillating saw operations,
to connect a dermatom to take skin,
to connect an automatic trepan to open the skull, without any danger,
to connect a high-speed cutter to cut bones, for example of a craneotomy,
to connect screw drivers, also those with automatic torque to introduce and remove bone screws,
to fit a boring wire support to bore long thin wires into bones, and
to fit a piston-shaped handle so that this apparatus may be gripped directly by the operator or by the pistol-shaped handle, and operated.

Further improvements and suitable embodiments of the subject matter of the application will be explained by way of the attached drawing which shows a preferred embodiment of the invention together with some tool holder heads preferably used with the invention. The device shown and described in this connection to drive the oscillating saw may preferably be used to advantage also with hand motors having only one speed range. In the drawings,

BRIEF DESCRIPTION OF THE DRAWINGS

FIGURE 1 shows a longitudinal sectional view of the gear housing of a hand motor designed in accordance with the invention, FIGURE 2 is an elevational view, partially in section, of the drive motor which, in the example of embodiment is provided in the form of an air motor, FIGURES 3a–c show a tool holder head to be fitted at the hand motor with a tool for boring and cutting operations, namely (3a) a longitudinal sectional view of the tool holder head, (3b) likewise a longitudinal sectional view of this head, this sectional view, however, being taken at right angles with respect to that of FIG. 3a, and (3c) a view taken on the right of the tool holder head of FIGURES 3a and 3b, FIGURES 4a–c show a tool holder head to drive an oscillating saw swinging to and fro, the saw blade being not shown, namely (4a) a longitudinal sectional view of the tool holder head, (4b) likewise a longitudinal sectional view of this tool holder, this sectional view, however, being taken vertically with respect to that of FIG. 4a, and (4c) an elevational view taken on the right of the tool holder head of FIGS. 4a–4b.

DESCRIPTION OF THE PREFERRED EMBODIMENTS

In accordance with the FIGURES 1–2, there are provided three planetary gearings 5, 6 and 7 arranged concentrically one behind the other in a gear housing 24 which are designed as reducing gears. An output shaft 1 is rotatably supported concentrically within these three planetary gearings. To support this shaft there are serving, on the one hand, a ball bearing 13 arranged in a closure lid 14 and, on the other hand, a ball bearing 15 supported in a cup-shaped extension 16 of a hollow shaft 17 arranged concentrically with respect to the output shaft 1.

The drive shaft 2 is driven by the shaft 20 of a motor 18 via a plug-in type pair of couplings 2, 19. This motor, in the example of embodiment is designed as an air motor and is actuated by means of a hand lever 21; it is connected on the one hand to a compressed air source via a connection 22, and, on the other hand, to a waste air collecting place. Instead of the air motor, also another motor, for example also an electric motor may be used. The air motor 18 is provided with a threaded connection 23, the outer thread 11 of which may be screwed into the inner thread 12 of a bore provided in the housing 24. In this manner, the gear housing 24 and the motor 18 are rigidly connected with each other, thus simultaneously coupling the motor shaft 20 with the output shaft 1 via the plug-in type coupling pair 2, 19.

The output shaft 1 is provided with a sun gear toothing 4 which meshes with the planetary gears 25 rotatably supported on a planetary carrier 26 and meshing with the inner toothing of the outer gear 27 which is stationarily arranged in the housing 24. The outer gear 27, the planetary gears 25 and the sun gear 4 form in common the planetary gearing 5.

The planet carrier 26 is rotatably supported in the housing 24 with the aid of a ball bearing 45 and a fixed intermediate member 28. It is rigidly connected with a hollow shaft 29 concentrically surrounding the output shaft 1 and provided with a sun gear toothing 30. This sun gear toothing meshes with the planetary gears 31, which are provided for rotation on a planet carrier 32 and are in turn in mesh with the inner toothing of the outer gear 33 which is fixedly arranged in the gear housing 24. The sun gear toothing 30, the planetary gears 31 and the outer gear 33 form the second planetary gearing 6.

The planetary gear carrier 32 is rotatably supported in the housing 24 by means of a ball bearing 46 and an intermediate member 34 and is rigidly connected with the hollow shaft 35 concentrically surrounding the output shaft 1 and provided with a sun gear toothing 47. This sun gear toothing 47 meshes with the planet gears 48 loosely rotatably supported on a planet gear carrier 36 and meshing wtih the inner toothing of the outer gear 37 fixedly supported in the housing. The sun gear toothing 47, the planet gears 48, and the outer gear 37 form the third planetary gearing 7.

The planet carrier 36 is rotatably supported in the housing with the aid of two ball bearings 38 and an intermediate member 39 which is supported against a shoulder 40 of the housing 24. The above mentioned shaft 17 is fixedly connected with this planet carrier 36, said shaft 17 being flared outwardly to the cup-shaped extension 16. This extension 16 carries a tooth coupling 8 on its outwardly facing annular edge, said tooth coupling being effective in one direction. This extension 16 surrounds concentrically a plug-in type coupling member 3 provided at the end of the output shaft 1.

The housing 24 includes a restricted extension 9 which serves as a push-on support for the various tool holder heads. The tool holder heads pushed-onto the restricted extension 9 are retained in their position with the aid of a screw 10 which simultaneously serves to retain a supporting ring 41 in a bore 42 of the housing 24.

A sealing 43 has one side engaging a supporting ring 41 retained by the screw 10 and inserted in an end bore 42 of the housing 24, the other side of the sealing 43 engaging the shoulder 40. Another supporting ring 44 which is supported on the one hand against a shoulder 49 of the shaft 1 and, on the other hand, against the ball bearing 15, serves to accommodate a sealing 45. There are no special sealings needed on the side of the coupling 2 because the motor 18 screwed into the threaded bore 12 secures a sealing effect.

It will be seen from the above examples that the driving side of the output shaft 1 is supported in the hollow shaft 17 with the aid of the ball bearing 15, and thus in the planet carrier 36 of the planetary gearing 7. The latter is then in turn supported in the housing 24 only via the bearing 38 and the intermediate member 39.

FIGURES 1 and 2 show an example of embodiment of about twice the dimensions, a speed of 22,000 r.p.m. being provided for the output shaft 1 with the plug-in type coupling 3, and a speed of 400 r.p.m. being provided for the output shaft 16 with the plug-in type coupling 8. The diameter of the housing 24 in this embodiment is only 33 mm. and the overall length of this housing is 75 mm.

The tool holder head of FIGURES 3a–3c serves to accommodate a suitable tool for boring or cutting which is not shown in more detail. The tool holder head general referenced 80 of these figures comprises a sleeve-like housing 81 which may be pushed onto the restricted extension 9 of the gear housing 24 and comprises a bayonet-like angularly extending slot 82 through which the fastening screw 10 may extend. A shaft 50 is supported in this housing with the aid of two antifriction bearings 83 said shaft being provided with a coupling head 51 which may cooperate with the coupling head 8. The two coupling halves 8, 51 are provided with serrated coupling claws effective in one direction in the manner as shown, said coupling claws being arranged in a radial plane and facing towards each other. The antifriction bearings 83 being detachably fastened in a bore of the housing 81 by means of screws 87.

The shaft 50 is axially fixedly supported in the bearings 83 and is provided with an axial bore 67 on its side facing outwardly forming a hollow shaft. Slots 53 with a transverse pin 52 extending therethrough are formed in the walls of the hollow shaft, said slots being aligned with respect to each other. This transverse pin serves to fasten a sleeve 54 which is displaceable supported on the outer periphery of the shaft 50. The sleeve 54, accordingly, is non-rotatable, but axially displaceably connected with the shaft 50, the region of the axial displaceability of the sleeve 54 being governed by the length of the slots 53.

The housing 80, in an outward direction, is provided with a first restriction 55 and a second restriction 56 with a shoulder-like flange formed therebetween. The restriction 56 serves to support the outer part of the hollow shaft 50. In the likewise sleeve-shaped restriction 55, there is another sleeve 58 supported for displacement, which comprises an inwardly facing flange lying closely against the shoulder flange 57 when in the position of rest as shown. Towards the outside, the sleeve 58 is provided with a gripping knob 60 gripping through a slot 61 of the sleeve-like extension 55.

A holding member 62 is fastened at the above mentioned transverse pin 52 which together with the pin 52 is supported for axial displacement in the bore 67 of the hollow shaft 50. The holding member 62 is urged into its position as shown in FIGURES 3a and 3b by a spring 63 which is supported on the one hand against the bottom of the bore 67 and on the other hand against this holding member 62.

As will be seen especially from FIGURE 3b, the holding member is provided with a groove-shaped portion 64. The extension 65 formed in this manner has approximately a semi-circular cross sectional area and, in the position as shown in FIGURES 3a and 3b, lies close against a locking pin 66 projecting into the bore 67 of the hollow shaft 50 and extending approximately vertically with respect to the axial surface 88 separating the outcut 64 from the extension 65. The tool, for example, the drill is provided with a groove and an extension at the fastening end, which correspond to the groove 64 and the extension 65 of the holding member 62. But in addition, the fastening end of the tool end still comprises a radial groove which starts from the bottom of the extension and extends axially only over part of the extension.

When the tool holder head 80 is pushed onto the housing 24 and fastened by means of the screw 10, the coupling 5–18 is at the same time engaged between the output shaft 16, 17 and the shaft 50. The tool is inserted into the bore 67 in such a manner that the extension of the fastening end of the tool is disposed outside the region of the transverse pin 66. Now, with the aid of the head 60, the holding member 62 is moved backward against the effect of the spring 63, and subsequently the radial groove of the fastening end of the tool, for example a drill, is rotated into the region of the transverse pin 66. In this position, the extension of the fastening end of the tool is disposed in the groove-shaped outcut 64 of the holding member 62.

Now the tool is not only safe against rotation but is also fixedly connected with the shaft 50 in an axial direction.

The tool holder head of the FIGURES 4a–4c serves to accommodate an oscillating saw blade, not shown, and is to be connected with the coupling 3. This tool holder head general referenced 68, in turn, comprises a sleeve-shaped housing 69 the sleeve of which is formed like that of the housing 81. Accordingly, also this sleeve is provided with an angular slot 82 for the formation of a bayonet closure which cooperates with the fastening screw 10. A shaft 72 is supported in the head with the aid of two anti-friction bearings 70, 71, the coupling end 73 of said shaft being capable of cooperating with the coupling 3. An eccentric or crank journal 74 is fastened on the outwardly pointing end of this shaft 72. The eccentric or crank journal 74 engages between the inner surface 76 of two jaws 86 by means of a ball bearing 75, said jaws being formed as a part of the lever 77 capable of performing a transversely directed sliding movement back and forth in front of the eccentric or crank journal 74. For the sake of clearness FIGURE 4b shows the outer rolling path of the ball bearing 75 as not being in contact with the two inner surfaces 76 of the jaws 86. Actually this is not true; the outer rolling path of the ball bearing 75 is in sliding contact with the surfaces 76. The axis of rotation and oscillation of the lever 77 thus extends vertically with respect to the axis of rotation of the shaft 72 and preferably intersects said axis. In a corresponding manner, the surfaces 76 with the jaws 77 are extending vertically with respect to the axis of rotation of the shaft 72 and form a cross loop as a special embodiment of a crank loop. This cross loop formed by the two surfaces 76 thus is adapted to be moved to and fro in a transverse direction in front of the eccentric or crank journal 74, the to and fro movement thereof being slightly different from the ideal linear to and fro movement due to the rotatable support of the lever 77.

The ball bearing constitutes the slide ring of this crank loop which, during the rotary movement of the eccentric or crank pin 74 performs a to and fro movement in the cross or crank loop. The two surfaces 76 and thus the two jaws 77 thus must be long enough to accommodate this to and fro movement. The outer rolling path of the ball bearing 75 which, when the eccentric or crank pin 74 rotates, performs a to and fro sliding movement along the crank loop surfaces 76, is slightly rounded as will be seen from FIGURES 4a and 4b, in order to take care of the fact that the cross or crank loop surfaces 76 do not perform a true linear movement but a rotary movement. In this manner, a jamming of the outer race of the ball bearing 75 in the cross or crank loop surfaces 76 is avoided. In a corresponding manner, the cross loop surfaces 76 may be rounded, too, i.e. with a curvature opposite to the curvature (please see FIGURE 4b) of the outer race of the ball bearing 75. Then, the outer race of the ball bearing 75 may be formed with linear generatrices in the form of a cylinder.

The lever 77 is detachably connected with a shaft 78 for example via a square 84, said shaft being provided with a toothing 79 onto which an oscillating saw blade may be pushed in any angular positions in a suitable manner not shown in more detail, and may be fastened by means of a nut, likewise not shown. The oscillating lever 77 with the shaft 78 is suitably supported in a special housing 85 which now is detachably fastened in turn only at the housing 69.

The workpiece holder head may also be provided with a miter gear, in particular for marrow space boring. In this case, use is suitably made of the coupling part 8. The output shaft of this change-speed transmission thus is disposed vertically with respect to the shaft 1 of the gear housing 24. The design of such a tool holder head does not differ from the design of known tool holder heads, so that it need not be shown in any more detail.

What we claim is:

1. A portable, multispeed driving device for surgical tools comprising, in combination, a casing having a power input end and a power output end, a shaft rotatably supported within said casing having an input end disposed adjacent said casing input end and an output end disposed adjacent to and accessible from said casing output end, speed reduction means within said casing having an input connected to said shaft and an output disposed adjacent to and accessible from said casing output end concentrically related to said shaft output end and separate therefrom, first clutch means defined on said shaft output end, second clutch means defined on said speed reduction output, drive means connected to said shaft input end, and tool head support means defined on said casing power output end whereby tool heads may be selectively mounted on said casing for driven engagement by one of said clutch means.

2. In a portable, multi-speed driving device as in claim 1 wherein said speed reduction means comprises a plurality of series connected planetary gear units located within said casing concentrically disposed about said shaft, the first of said units including a sun gear connected to said shaft, the last of said units including a hollow extension concentrically disposed about said shaft output end constituting said speed reduction means output.

3. In a portable, multi-speed driving device as in claim 1, motor mounting means defined on said casing power input end, and a motor connected to said motor mounting means having a drive connected to said shaft input end.

4. A portable, multi-speed, powered surgical tool system comprising, in combination, a drive casing having tool head support means defined thereon, a plurality of multi-speed drive means within said casing each having an output, said outputs comprising elements rotating at different angular velocities about a common axis, the output elements of the various multi-speed drive means being at different radial locations with respect to said axis and each including clutch means, a plurality of tool heads adapted to be individually, selectively supported upon said casing tool head support means, each tool head including a driven member clutch rotatable about an axis coaxially aligned with said common axis upon the tool head being supported upon said casing, the driven member clutch of the various tool heads being radially spaced from its axis a distance as to engage the clutch with the appropriate predetermined casing clutch means whereby supporting a tool head upon said casing automatically engages its driven member clutch with the desired multi-speed output element.

5. In a surgical tool system as in claim 4 wherein said casing tool head support means includes a circular surface concentric with said common axis and said tool heads each include a circular surface concentric to its associated driven member axis complementary to said casing cylindrical surface and engageable therewith, said output element clutch means and said driven member clutches including axially extending mutually engaging surfaces whereby radially aligned output element clutch means and driven member clutches automatically engage upon displacement of said casing and a tool head in the direction of the alignment of said common axis and a tool head axis.

References Cited

UNITED STATES PATENTS

| 2,759,374 | 8/1956 | Bowman et al. | 74—750 |
| 3,319,492 | 5/1967 | Magnuson | 74—750 |

FOREIGN PATENTS

| 916,151 | 8/1954 | Germany. |
| 1,142,169 | 3/1957 | France. |
| 903,495 | 8/1962 | Great Britain. |
| 1,150,630 | 6/1963 | Germany. |

FRED C. MATTERN, Jr., Primary Examiner

MANUEL ANTONAKAS, Assistant Examiner

U.S. Cl. X.R.

74—750; 81—57